United States Patent [19]
Kelleher

[11] 3,828,208
[45] Aug. 6, 1974

[54] DRIVER CIRCUIT USING DIODES TO CONTROL THE MINORITY CARRIER STORAGE EFFECT IN SWITCHED TRANSISTORS

[75] Inventor: John J. Kelleher, Tewksbury, Mass.
[73] Assignee: Raytheon Company, Lexington, Mass.
[22] Filed: Jan. 31, 1972
[21] Appl. No.: 222,170

[52] U.S. Cl. ............... 307/270, 307/280, 307/262, 307/285, 307/282
[51] Int. Cl. ............................................ H03k 1/00
[58] Field of Search ....... 332/43 B; 321/2, 18, 45 R; 307/262, 270, 313, 280, 282, 285

[56] References Cited
UNITED STATES PATENTS

| | | | |
|---|---|---|---|
| 2,809,303 | 10/1957 | Collins | 321/45 R |
| 2,862,171 | 11/1958 | Freeborn | 307/317 |
| 2,997,602 | 8/1961 | Eachus | 307/282 |
| 3,219,906 | 11/1965 | Kelier | 321/45 R |
| 3,247,447 | 4/1966 | Flairty | 321/45 R |
| 3,317,815 | 5/1967 | Merriy | 321/45 R |
| 3,350,661 | 10/1967 | Bloom | 321/45 R |
| 3,351,840 | 11/1967 | Yearly | 321/45 R |
| 3,365,650 | 1/1968 | Camp | 321/45 R |
| 3,426,245 | 2/1969 | Yurasek | 307/313 |
| 3,490,027 | 10/1957 | Galetto | 321/11 |
| 3,629,725 | 12/1971 | Chun | 321/45 R |

*Primary Examiner*—John S. Heyman
*Attorney, Agent, or Firm*—Philip J. McFarland; Joseph D. Pannone

[57] ABSTRACT

An improved driver circuit for a pair of switching transistors in a DC-DC converter or a DC-AC inverter is shown. The illustrated circuit includes a switchable constant current source coupled through a transformer and semiconductor diodes to the switching transistors. The diodes are arranged so that, as long as minority carrier current flows in either one of the switching transistors, the other is prevented from responding to a switching signal from the constant current source.

2 Claims, 2 Drawing Figures

DRIVER CIRCUIT USING DIODES TO CONTROL THE MINORITY CARRIER STORAGE EFFECT IN SWITCHED TRANSISTORS

The invention herein described was made in the course of or under a contract or subcontract thereunder, with the Department of Defense.

BACKGROUND OF THE INVENTION

This invention pertains generally to electric power supplies and particularly to inverters and converters using transistors.

It is known in the art that difficulty is sometimes experienced in the operation of DC-AC inverters and DC-DC converters using transistors. The difficulty arises by reason of the fact that, unless special provision in the design is made, so-called "simultaneous switching" losses are experienced. That is, the switching transistors in circuits of such type, which elements, in theory, should be turned "on" and "off" during mutually exclusive periods of time may sometimes be "on" simultaneously. When this occurs, albeit for only a relatively short period, the power supply is short-circuited through the switching transistors. The high peak power resulting from such a short circuit, which peak is very much greater than the peak power ordinarily drawn from the power supply, must be dissipated in the switching transistors. Obviously, then, unwanted regulation of the power supply or even damage to the switching transistors results.

It is known that simultaneous switching losses in circuitry, as DC-AC inverters and DC-DC converters, using a pair of switching transistors are the result of the characteristic delay between the instant at which a reversing signal is applied to any transistor and the instant at which such a signal is actually effective. When power transistors are involved, such a delay is relatively large.

If it is necessary only to reduce simultaneous switching losses, any one of several known approaches may be followed. For example, the reversing signals applied to the transistors may be passed through a conventional parallel resistor/capacitor coupling circuit before application to the transistors. As is known, the effet of such a coupling is to speed up the switching operation of the transistors, thereby to reduce the period of time during which the transistors may both be conducting. Another known way of reducing simultaneous switching losses is to so bias the transistors that neither, when in its conducting state, may be saturated. If this approach is followed, however, overall power dissipation is increased. If it is necessary to eliminate simultaneous switching losses altogether, it is known to provide separate reversing signals to the switching transistors. Such reversing signals are so phased with respect to each other that the characteristic delay period has elapsed for each transistor before the other is switched on. Obviously, however, separate reversing signals may be obtained only at the price of increasing complexity.

SUMMARY OF THE INVENTION

In view of the foregoing, it is an object of this invention to provide improved circuitry in transistorized inverters and converters to eliminate simultaneous switching losses.

Another object of this invention is to provide improved circuitry in transistorized inverters and converters to eliminate simultaneous switching losses without adding to the complexity of such apparatus.

These and other objects of this invention are attained generally by providing, as a part of a conventional constant current driver circuit for a pair of switching transistors in an inverter or a converter, biasing means for each one of such transistors, such means being operative automatically when minority carrier current flows in either one of such transistors during operation, first to maintain the off transistor in its nonconducting state until the on transistor has been switched to its nonconducting state and then to permit the off transistor to be switched to its conducting state.

BRIEF DESCRIPTION OF THE DRAWINGS

For a more complete understanding of this invention reference is now made to the following description of a preferred embodiment of this invention as illustrated in the accompanying drawings, in which.

DESCRIPTION OF THE PREFERRED EMBODIMENT

Figure 1:
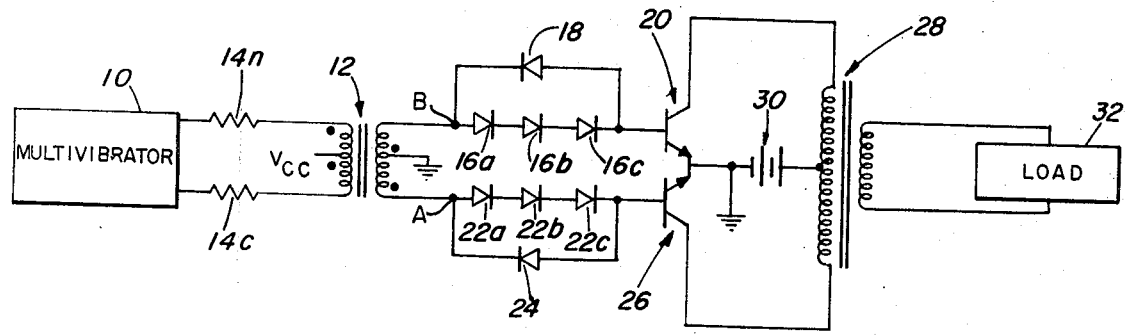
FIG. 1 is a combined block and schematic drawing showing a manner in which it is contemplated to provide the desired automatic control of a pair of switching transistors.

Referring now to FIG. 1 it may be seen that a constant current base drive circuit for use in a DC-AC inverter as here contemplated includes a free-running multivibrator 10 having its normal and complementary outputs (not numbered) connected to the ends of the primary winding of a transformer 12 through resistors 14n, 14c. A centertap of the primary winding is connected to a source (not shown) of direct current, $V_{cc}$. A centertap of the secondary winding of the transformer 12 is grounded as shown. One end of the secondary winding of the transformer 12 is connected, through diodes 16a, 16b, 16c and 18 to the base electrode of a switching transistor 20. The second end of the transformer 12 is connected through diodes 22a, 22b, 22c and 24 to the base electrode of a switching transistor 26. It is evident, therefore, that complementary control signals are applied to points A and B. The emitter electrodes of the switching transistors are grounded as shown. The collector electrodes of the switching transistors 20, 26 are connected to the ends of the primary winding of an output transformer 28. A DC source 30, whose output voltage is here to be inverted, is connected to a centertap of such input winding. To complete the circuit, a load 32 is connected across the secondary winding of the output transformer 28.

It will be evident now that the direction of current flow through the primary winding of the output transformer 28 is dependent upon which one of the switching transistors 20, 26 is in its conductive state. It follows, then, that if such transistors are caused to switch on and off periodically during mutually exclusive periods of time, then the voltage out of the DC source 30 will be "chopped" in a conventional way and the voltage across the load 32 will be an AC voltage. The amplitude of such voltage will, of course, in the first instance be dependent upon the amplitude of the voltage out of the DC source 30 and the turns ratio of the output transformer 28. The fundamental frequency of such AC voltage will be dependent upon the rate at which the switching transistors 20, 26 are switched. It will also be evident that, if for any reason, both switching transistors 20, 26 are in their conducting states simultaneously, the transformer action of the output transformer 28 is interrupted and the impedance across the DC source 30 then decreases markedly.

Simultaneous conduction by the switching transistors 20, 26 is prevented in a manner now to be described. Thus, assuming switching transistor 26 to be in its conducting state and multivibrator 10 just ready to produce a signal to turn such transistor off and to turn transistor 20 on, i.e. switching transistor 26 and diodes 22a, 22b, 22c to be initially saturated, the voltage at point A is, with respect to the emitter electrode of such transistor, equal to approximately 4 volts (positive). At the same time, resistors 14n, 14c and the turns ratio of the transformer 12 are so adjusted that the voltage at point B equals approximately 4 volts (negative). It follows, then, that when a switching signal having an amplitude of say 3 volts is generated by the multivibrator 10, the voltage at point A starts to move negative, thereby back biasing diodes 22a, 22b, 22c and forward biasing diode 24. The minority carrier current between the base and emitter electrodes of the switching transistor 26 prevents that element from being turned off immediately. Thus, the voltage at the base electrode of the switching transistor 26 remains at a low positive value, say 0.3 volt. The diode 24 conducts to prevent the voltage at point A from falling below approximately 1.0 volt (negative). In other words, point A is clamped at 1 volt (negative) as long as minority carrier current flows through switching transistor 26. Because of the symmetry of the circuit, point B similarly is clamped to a voltage of approximately 1 volt (positive). Such voltage level is not sufficiently positive to bias diodes 16a, 16b, 16c and switching transistor 20 into their conducting states. When the minority carrier current of the switching transistor 26 stops flowing, diode 24 also stops conducting, thus removing the clamp at point A. The voltage at point B is, therefore, free to rise to bias diodes 16a, 16b, 16c and switching transistor 20 into their conducting states to complete the requisite switching action. Obviously the action just described is duplicated, when switching transistor 20 is to be turned off and transistor 26 is to be turned on, by diode 18 and transistor 20 to prevent transistor 26 from conducting until minority carrier current flow stops in transistor 20.

Figure 2:
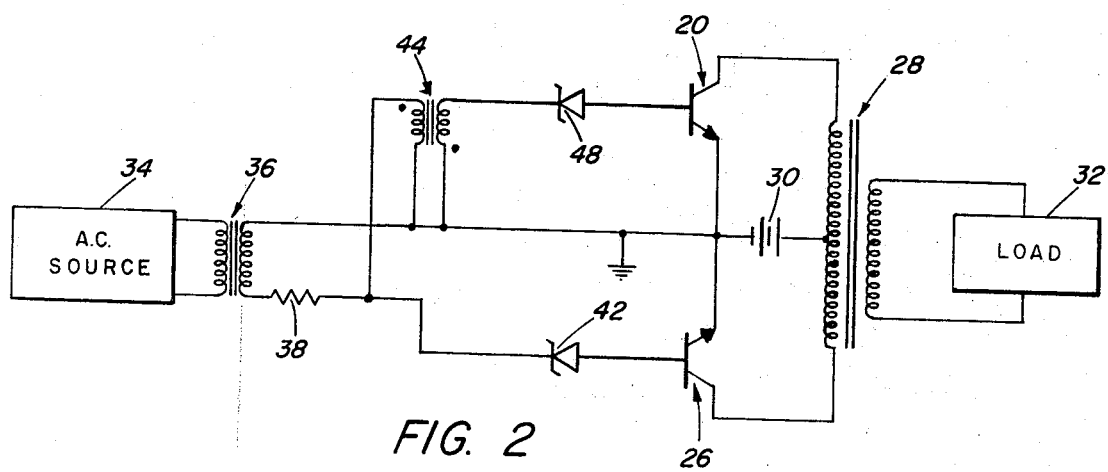
FIG. 2 is a combined block and schematic drawing showing an alternate embodiment of this invention.

Referring now to FIG. 2, wherein elements identical to those shown in FIG. 1 are similarly numbered, it may be seen that the differences between the two embodiments lie in the constant current source and the biasing means for the switching transistors. Thus, in FIG. 2 the constant current source is made up of an AC source connected through a transformer 36 to a limiting resistor 38. The biasing means is partially made up of a zener diode 42 (corresponding, respectively, to diodes 22a, 22b, 22c and diode 24 of FIG. 1). To complete the biasing means, the limiting resistor 38 is connected, through a transformer 44, to zener diode 48 (corresponding to diodes 16a, 16b, 16c and 18 of FIG. 1). It will be recognized that, as the polarity of the signal out of the AC source 34 is changed, the effect of such signal in switching the off transistor to its conducting state is delayed until any minority carrier current in the transistor then on has been discharged. It follows, then, that the remainder of the illustrated circuit operates in the same way as previously described in connection with the embodiment shown in FIG. 1.

Having described preferred embodiments of this invention, it will now become clear to one of skill in the art that many changes and modifications may be made without departing from my inventive concept. That is, so long as the idea is followed that the operation of switching transistors in a DC-DC converter or a DC-AC inverter may be made to occur in mutually exclusive periods of time by inhibiting switching of either such transistor on when minority carrier current flows in the other, the elements may be changed. For example, there is no absolute requirement that there be just three forward biased diodes; obviously the number may be changed. It is felt, therefore, that this invention should not be restricted to its disclosed embodiment, but rather should be limited only by the spirit and scope of the appended claims.

What is claimed is:

1. In switching circuitry wherein each one of a pair of like transistors is repetitively switched on and off during mutually exclusive periods of time in response to driving signals consisting of a pair of complementary rectangular waves, the improvement comprising:
   a. oppositely poled first and second unidirectional conducting means connected to a control electrode of a first one of a pair of like transistors to be switched on and off, the voltage drop across the first unidirectional conducting means, when conducting, being less than the voltage drop of the second unidirectional means, when conducting;
   b. similarly oppositely poled third and fourth unidirectional conducting means connected to a control electrode of a second one of the pair of like transistors, the voltage drop across the third unidirectional conducting means being, when conducting, equal to the voltage drop across the first unidirectional conducting means, when conducting, and less than the voltage drop across the fourth unidirectional conducting means, when conducting; and
   c. center-tapped transformer means for applying a first one of a pair of complementary rectangular waves to the first and the second unidirectional conducting means and for applying a second one of the pair of complementary rectangular waves to the third and fourth unidirectional conducting means.

2. The improvement as in claim 1 wherein:
   a. the first and the third unidirectional conducting means, each comprising a semiconductor diode; and
   b. the second and the fourth unidirectional means, each comprising a plurality of similarly poled semiconductor diodes connected in series.

* * * * *